United States Patent [19]
Kellett

[11] Patent Number: 5,849,066
[45] Date of Patent: Dec. 15, 1998

[54] INK JET FLUID COMPOSITION AND INK JET PRINTING USING SAME

[75] Inventor: Richard M. Kellett, Longmeadow, Mass.

[73] Assignee: New England Science & Specialty Products, Inc., Chicopee, Mass.

[21] Appl. No.: 5,410

[22] Filed: Jan. 9, 1998

Related U.S. Application Data

[62] Division of Ser. No. 645,747, May 14, 1996, Pat. No. 5,738,013.

[51] Int. Cl.$^6$ ..................................................... C09D 11/02
[52] U.S. Cl. ..................................... 106/31.13; 106/31.27; 106/31.35; 106/31.6; 106/31.67; 347/96; 347/102
[58] Field of Search .............................. 106/31.13, 31.27, 106/31.35, 31.6, 31.67; 347/92, 102

[56] References Cited

U.S. PATENT DOCUMENTS

| | | | |
|---|---|---|---|
| 3,138,477 | 6/1964 | Torstenson | 106/266 |
| 3,773,538 | 11/1973 | Milutin et al. | 106/31.69 |
| 5,006,862 | 4/1991 | Adamic | 347/101 |
| 5,380,769 | 1/1995 | Titterington et al. | 347/96 |
| 5,429,860 | 7/1995 | Held et al. | 428/195 |
| 5,542,972 | 8/1996 | Von Der Eltz et al. | 347/96 |

*Primary Examiner*—Helene Klemanski
*Attorney, Agent, or Firm*—Sampson & Associates, P.C.; Steven A. Carlson

[57] ABSTRACT

Provided is an ink jet fluid composition which comprises a liquid carrier medium and one or more chromium complexes of organic acids. Upon ink jet printing on a printing medium and subsequent exposure to an energy source, a durable and water-insoluble layer is formed. Such an ink jet fluid composition and printing process can be advantageously used to produce durable and water-insoluble images on printing media.

10 Claims, No Drawings

INK JET FLUID COMPOSITION AND INK JET PRINTING USING SAME

RELATED APPLICATION

This application is a divisional of U.S. patent application Ser. No. 08/645,747, filed May 14, 1996 now U.S. Pat. No. 5,738,013.

FIELD OF THE INVENTION

This invention relates to an ink jet fluid composition for use in ink jet printing to produce a more durable, water-fast image, and to methods for ink jet printing using this ink jet fluid composition.

BACKGROUND OF THE INVENTION

Throughout this application, various publications, patents, and published patent applications are referred to by an identifying citation. The disclosures of the publications, patents, and published patent applications referenced in this application are hereby incorporated by reference into the present application.

Lithographic printing has long been the most widely used printing technique, especially for short to medium printing run lengths of 1,000 to 15,000. The term "lithographic" is meant to include various terms used synonymously, such as offset, offset lithographic, wet lithographic, planographic, and others. Most lithographic plates are still produced photographically. The disadvantages of this and some of the alternative lithographic plate materials and processes are described in U.S. Pat. Nos. 4,958,563 and 5,487,338.

With the advent of the computer in revolutionizing the graphics design process leading to printing, there have been extensive efforts to develop a convenient and inexpensive computer-to-plate system, particularly for use in lithographic printing. Many of the new computer-to-plate systems are large, complex, and expensive. They are designed for use by large printing companies as a means to streamline the prepress process of their printing operations and to take advantage of the rapid exchange and response to the digital information of graphics designs provided by their customers. There remains a strong need for an economical and efficient computer-to-plate system for the many smaller printers who utilize lithographic printing.

A number of electronic, non-impact printing systems have been investigated for use in making lithographic printing plates to satisfy the needs of these smaller printers. Foremost among these have been laser printing systems, for example as described in U.S. Pat. No. 5,304,443 and references therein. These have had some limited success, but have not been able to overcome the disadvantages of undesired background toner imaging, limitation to small sizes (approximately 11 inches by 18 inches) which are too small for many applications, and limitation to only those flexible substrates such as paper and plastic films which can transport through the laser printers.

Another non-impact printing system which has received attention for economical and convenient computer-to-plate preparation for lithographic printing is thermal transfer printing, for example, as described in U.S. Pat. No. 4,958,564. This involves the printing of a hydrophobic wax or resin material on to the lithographic printing blank. This approach has similar size and flexible substrate limitations as described above for laser printing. In addition, the nature of the thermal transfer process is very demanding on intimate contact of the wax or resin donor ribbon to the receiver substrate to obtain consistent image quality. For this latter reason especially, the low cost thermal transfer printers in wide use for hard copy color output printing from computers are not used to prepare lithographic printing plates. Instead, more expensive, specially built thermal transfer printers have been proposed. The widely used printers for hard copy computer output that have seen some use in making lithographic plates are laser printers, in spite of their aforementioned disadvantages.

In recent years, ink jet printers have replaced laser printers as the most popular hard copy output printers for computers. Some of the competitive advantages of ink jet printers have been low cost, reliability, and the ability to make color images without significantly increasing the cost of the printer. Both thermal ink jet and piezoelectric ink jet printing methods have been widely adopted for desktop computer printing. A third conventional type of ink jet printing, a continuous flow type method, has found acceptance in high quality color printing and proofing in graphics applications.

In spite of the very large and rapidly growing installed base of low cost desktop ink jet printers as well as a large number of higher cost, larger size ink jet printers used in prepress proofing and in printing output, there has not been use of these ink jet printers to make lithographic printing plates. There have been some reports in the literature proposing the use of ink jet printers to make lithographic printing plates. For example, in Japanese Kokai 62-25081, an oleophilic liquid or fluid ink was printed by ink jet printing on to a hydrophilic aluminum surface of a lithographic printing plate. Titanate or silane coupling agents were present in the ink. U.S. Pat. No. 5,312,654 describes the use of a photopolymerizable ink jet ink composition printed on a substrate with a hydrophilic layer and with an ink absorbing layer to prepare a lithographic printing plate. U.S. Pat. No. 4,003,312 describes preparing waterless lithographic printing masters by the use of an ink jet ink composition containing materials with groups reactive with the reactive pendant groups of a silicone coated on a lithographic plate.

An ink jet printing apparatus to make lithographic printing plates is described in PCT WO 94/11191. It is directed to depositing hydrophobic or hydrophilic substances on hydrophobic printing plates. A process for production of lithographic printing plates using the ink jet liquid droplets comprising resin forming reactants which polymerize on the plate surface, alone or in combination with reactants precoated on the plate, is described in Eur. Patent Application 776,763 A1.

In U.S. Pat. No. 5,501,150, a fluid ink and hydrophilic media set containing materials to produce a silver-reducible image by ink jet printing are used to make a metallic silver image which, following wet processing to make the silver image sufficiently hydrophobic, is said to provide a lithographic printing plate.

Ink jet printing where the ink is a solid or phase change type ink instead of a liquid or fluid type ink is described in U.S. Pat. No. 4,833,486 to deposit a hot wax on a surface of an offset plate. Upon cooling of the wax, it solidifies, thereby providing a printing plate. Solid ink jet printing has serious disadvantages for lithographic plates in that the wax or resin image has limited durability due to its thermoplastic, chemical, and adhesive properties and the amount and rounded shape of the solidified ink jet droplet on the media do not have the intrinsic image resolution properties found in liquid or fluid ink jet printing.

Ink jet printing has been used to apply an opaque image or mask pattern to a photosensitive lithographic printing plate blank, as for example, described in Japanese Kokai 63-109,052. The blank is then exposed through the ink jet imaged mask pattern and then processed by conventional means to provide a lithographic printing plate. This approach retains the materials and processing of conventional lithographic printing plates and only uses ink jet printing as an alternative in the photomask through which the conventional plates are exposed. Thus this approach adds to the complexity and expense of the platemaking process and does not depend on the ink jet ink image for the hydrophobic image of the plate. U.S. Pat. No. 5,495,803 describes a solid or phase change type of ink jet printing to form a photomask for a printing plate.

Much of the technical development in ink jet printing has been directed to color and black imaging for computer hard copy output. The need for more archival, durable, and waterfast imaged media has led to ink jet inks and receiver media that contain chemically reactive components. For example, U.S. Pat. No. 5,429,860 describes a reactive ink jet ink/media set where the receiver media has a reactive component which reacts with the ink to give a more durable image and reacts in the non-image areas to give a durable coating. This patent is directed to durable colorant imaging elements and has no teaching on durable oleophilic material imaging elements or production of lithographic printing plates, which are the subjects of the present invention. Also, as for example, U.S. Pat. 5,006,862 describes the use of reactive colorants in the liquid ink jet ink or fluid to provide more durable, waterfast, and bleed resistant images when printed on the media. These approaches for archival, more durable color and black ink jet images do not address the requirements for a durable hydrophobic image suitable for a lithographic printing plate. It would be advantageous to have a liquid ink jet ink or fluid that could be used on the large installed and future base of ink jet printers, now used extensively to print colorants on media, to print a durable oleophilic and water-insoluble image, particularly for use on a suitable lithographic printing plate blank to make a lithographic printing plate.

Accordingly, it is an object of this invention to provide a liquid ink jet ink or fluid that provides an oleophilic, durable, and water-fast image upon ink jet printing.

Another object of this invention is to provide a liquid ink jet fluid-media set that provides an oleophilic, durable, and water-fast image with a hydrophilic, durable non-image area. It is a further object of this invention that this liquid ink jet fluid-media set provides an imaged printing plate suitable for high quality lithographic printing.

It is a further object of this invention that the liquid ink jet fluid-media set be capable of being printed on conventional, low cost desktop ink jet printers to provide an imaged printing plate suitable for high quality lithographic printing. Yet another object of this invention is that the liquid ink jet fluid-media set is capable of being printed on conventional large format ink jet printers with printing widths and lengths in excess of 24 inches to provide an imaged printing plate suitable for high quality lithographic printing. Still another object of this invention is that the liquid ink jet fluid-media set is capable of being printed on ink jet printers of all sizes with a wider choice of rigid and flexible media than with laser and other non-impact printers to provide an imaged printing plate suitable for high quality lithographic printing.

It is a further object of this invention that no wet processing step, before or after the ink jet printing, is required to provide an imaged printing plate suitable for high quality lithographic printing.

It is another object of this invention that no colorant is required in the liquid ink jet fluid to provide an oleophilic, durable, and waterfast image and to provide an imaged printing plate suitable for high quality lithographic printing.

It is a further object of this invention that no metal precursor is required in the liquid ink jet fluid or the media and no metal is required in the image areas to provide an oleophilic, durable, and water-fast image and to provide an imaged printing plate suitable for high quality lithographic printing.

Still another object of this invention is to provide a convenient and economical method to provide an imaged printing plate suitable for high quality lithographic printing.

These and other objects of the present invention will become apparent upon a review of the following specification and the claims appended thereto.

SUMMARY OF THE INVENTION

In accordance with the foregoing objectives, there is provided by the present invention an ink jet liquid or fluid containing an organic or transition metal complex reactive component and a hydrophilic media. Such a fluid composition and media are, in general, useful as novel materials in the preparation of a lithographic printing plate, as well as of durable, waterfast imaged materials. In a preferred embodiment, the ink jet fluid contains isocyanates, blocked isocyanates, diketenes, diketene emulsions, polyamide epoxides, acid anhydrides, acid chlorides, or chromium complexes of organic acids as the reactive component. Upon ink jet printing on a hydrophilic media and subsequent exposure to an external energy source or another suitable means, an oleophilic, durable, and water-insoluble imaged media with hydrophilic non-image areas is obtained.

It is most preferred that the ink jet fluid contains blocked isocyanates, diketene emulsions, or chromium complexes of organic acids as the reactive component.

A process for the production of such an imaged lithographic printing plate using ink jet printing is also provided herewith.

DETAILED DESCRIPTION OF THE PREFERRED EMBODIMENTS OF THE INVENTION

The novel ink jet fluid marking material of the present invention comprises a liquid carrier and at least one organic or transition metal complex reactive component. The liquid carrier is water or organic solvents or combinations thereof Choice of the specific liquid carrier depends on the specific ink jet printer and its compatible ink jet printing head and cartridge being used for the ink jet printing. It also depends on the specific reactive component selected. Compatibility with both the ink jet hardware and with the reactive component is important in the selection of the liquid carrier. The types of liquid carriers suitable for use with the different types of ink jet printheads is known in the art, for example, as described in U.S. Pat. No. 5,085,698. In general, the piezoelectric and continuous flow types of ink jet printheads have a wider latitude of acceptable liquid carriers than the thermal or bubble type of ink jet printhead. For example, piezoelectric ink jet printheads work acceptably with various non-aqueous or organic liquid carriers while thermal ink jet printheads typically need a high percentage of water or volatile organic solvent in the liquid carrier.

Likewise, the reactive components of this invention often have a compatibility with the types of liquid carriers that is known in the art. For example, some of the reactive components of this invention, such as isocyanates, ketenes, and acid anhydrides, are typically sufficiently reactive with water that they would only be compatible with non-aqueous or organic liquid carriers. If the compatiblity is not known, it can be readily estimated by mixing the reactive component in the liquid carrier in the desired amounts and using conventional chemical and physical methods, such as quantitative analysis of any change or decomposition of the reactive component, to measure stability. This is not sufficient to insure that the reactive component will be compatible and stable in the ink jet printhead during the conditions of storage and printing and in the presence of other materials besides the liquid carrier which are typically included in the ink jet fluid composition. For this reason, the final selection of the suitable liquid carrier for each reactive component needs to be demonstrated in the specific ink jet printer to be utilized and with the complete ink jet fluid composition, including other additives, present.

The organic and transition metal complex reactive components of this invention are selected for their capability, in addition to being compatible and stable enough to be utilized in at least one type of ink jet printhead with a suitable liquid carrier, to form an oleophilic, water insoluble, and durable image when printed on a hydrophilic receiving layer and subsequently exposed to an external energy source or other suitable means to cause the reaction of the reactive component. In the present invention it is preferred that the reactive component is an isocyanate, blocked isocyanate, diketene, diketene emulsion, polyamide epoxide, acid anhydride, acid chloride, or chromium complex of an organic acid. Examples of these reactive components include isocyanates sold under the LUPRANATE trade name by BASF Corporation, such as LUPRANATE M205; blocked isocyanates sold under the DESMODUR trade name by Bayer Corporation, such as DESMODUR BL3175; diketenes sold under the AQUAPEL trade name by Hercules Corporation; diketene emulsions sold under the HERCON trade name by Hercules Corporation, such as HERCON 79; polyamide epoxides sold under the POLYCUP trade name by Hercules Corporation, such as POLYCUP 172; acid anhydrides sold under the GANTREZ trade name by ISP Corporation, such as long alkyl chain vinyl ether-maleic anhydride copolymers; palmitoyl chloride from Aldrich Chemical Company; and chromium complexes of organic acids sold under the QUILON trade name by Dupont Corporation, a 25 to 30% by weight solution of the Werner complex of trivalent chromium and myristic or stearic acid in isopropyl alcohol, as described in *Ouilon Chrome Complexes, Dupont Corporation*, April 1992, such as for example, QUILON C. In a most preferred embodiment, the reactive component is a blocked isocyanate, diketene emulsion, or chromium complex of an organic acid.

While not wishing to be bound to a particular theory, the ink jet inks or fluids of the present invention achieve a unique combination of oleophilicity, water-insolubility, and durability upon ink jet printing and subsequent reaction which is not present in ink jet inks of the prior art, including those containing colorants with reactive groups or reactive additives and those containing titanate and silane coupling agents. This advantageous combination of properties is attributed in part to the superior film forming properties of the reactive components of the present invention. These film forming properties provide the good mechanical integrity or durability over a range of image thicknesses and the strong bonding to the receiving layer that are needed for demanding applications such as lithographic printing plates and for other archival, durable applications in general.

Another preferred reactive component is an electron beam, ultraviolet, visible, or infrared radiation curable material. In a most preferred embodiment, the radiation curable material contains unsaturated acrylic or vinyl groups. With the proper selection of radiation-sensitive reactive groups and of oleophilic groups in these radiation curable materials, the unique combination of oleophilicity, durability, and water-insolubility properties described above can also be achieved with these film forming materials.

The media of the present invention is for use with the ink jet fluid marking material of the present invention and comprises a support that bears a receiving layer containing at least one hydrophilic material. The selection of this hydrophilic material is made based on its performance in three main areas: receptivity to the ink jet fluid marking material to provide a high quality image with the desired resolution, amount, and uniformity; interaction with the reactive component in the ink jet fluid to provide a durable image; and the hydrophilic properties and water-fastness properties needed for high quality lithographic printing. For example, most aqueous-based ink jet fluids need a hydrophilic receiving surface for good image quality. The hydrophilic properties and water-fastness needed in lithographic printing are well known in the art.

Preferred hydrophilic materials in the present invention are polyvinyl alcohols and copolymers thereof, cellulosic polymers, polyvinyl acetates and copolymers thereof, polyacrylates and copolymers thereof, polymethacrylates and copolymers thereof polymaleic anhydrides and derivatives and copolymers thereof polyvinyl acetals and copolymers thereof, polyvinyl pyrrolidones and copolymers thereof, polyamides, or inorganic polymers. In a most preferred embodiment, the hydrophilic material contains polyvinyl alcohol or a copolymer thereof, aluminum boehmite, alumina, a silicate, or silica. The inorganic polymers are typically formed from a sol gel, colloidal particle deposition, or anodization process to provide a gel or network of inorganic polymer.

Although the supports for the media of this invention can be selected from a wide range of materials commonly used in lithographic printing plates with a basic requirement that the media with this support be capable of transport through the ink jet printing hardware where the media is required to be transported, the preferred supports are paper, plastic polymer film, or aluminum.

After the ink jet fluid marking material of the present invention is printed on the media of this invention, the reactive component needs to be reacted by exposure to an external energy source or other suitable means. For the non-radiation curable reactive components of the present invention, the preferred external energy source is heat. For the radiation curable reactive components of the present invention, the preferred external energy source is the radiation, such as ultraviolet radiation, to which the material is most efficiently sensitive. For some non-radiation curable reactive components such as some isocyanates, ambient conditions are sufficient means to provide an effective reaction.

In a preferred embodiment, a catalyst is added to the ink jet fluid marking material to increase the rate of reaction of the reactive component after printing and upon exposure to the external energy source or other suitable means to cause reaction. In a most preferred embodiment, the catalyst that is added is a metal complex, such as stannous stearate.

In another preferred embodiment, the receiving layer of the media also comprises a catalyst to increase the rate of reaction of the reactive component after printing and upon exposure to the external energy source or other suitable means to cause reaction. In a most preferred embodiment, the catalyst that is added to the receiving layer is an alkaline material. Some of the reactive components react under alkaline conditions, but are stable in acidic conditions. Thus, these reactive components must be in the ink jet fluid of the present invention in an acidic environment, but require the presence of an alkaline material in the receiving layer to cause the desired reactivity.

In another embodiment of the present invention, the reactive component in the ink jet fluid marking material reacts with the hydrophilic material in the receiving layer of the media. In a preferred embodiment, the reactive component that reacts with the hydrophilic material in the receiving layer is an isocyanate, blocked isocyanate, diketene, diketene emulsion, polyamide epoxide, acid anhydride, acid chloride, or chromium complex of an organic acid. In a most preferred embodiment, the reactive component that reacts with the hydrophilic material in the receiving layer is a blocked isocyanate, a diketene emulsion, or a chromium complex of an organic acid.

The novel method of preparing an imaged lithographic printing plate of the present invention comprises providing a lithographic plate blank having a support that bears a receiving layer containing at least one hydrophilic material. An image is formed on this receiving surface using an ink jet printer which prints an ink jet fluid marking material which comprises a liquid carrier medium and at least one organic or transition metal complex reactive component. After ink jet printing, the lithographic plate blank with the imaged pattern comprising the reactive component is exposed to an external energy source or other suitable means to cause the reaction of the reactive component. This forms an effective amount of an oleophilic and water-insoluble pattern on the lithographic plate blank, thereby preparing it for high quality lithographic printing.

In a preferred embodiment of the method of the present invention, the reactive component is an isocyanate, blocked isocyanate, diketene, diketene emulsion, polyamide epoxide, acid anhydride, acid chloride, or chromium complex of an organic acid. In a most preferred embodiment of the method of the present invention, the reactive component is a blocked isocyanate, a diketene emulsion, or a chromium complex of an organic acid.

The invention will now be more fully explained by the following examples. However, the scope of the invention is not intended to be limited to these examples.

EXAMPLE 1

An EPSON (trade name of Epson Corporation) black ink jet cartridge, catalog #5020047, was opened. After removing the internal sponge, the cartridge was rinsed thoroughly with dimethyl sulfoxide. An ink jet fluid consisting of 1 part of a blocked isocyanate, sold under the trade name of DESMO-DUR BL3175A by Bayer Corporation, and 4 parts of dimethyl sulfoxide was prepared and used to fill the cartridge. The cartridge was then taped shut and placed in the cartridge holder of an EPSON ink jet printer, a piezoelectric type desktop ink jet printer sold under the trade name of STYLUS COLOR IIS.

Images were jetted on to printing plates sold under the trade name of the GENIE brand. The images were heated for 5 minutes with a hot air gun set at 900° F. and held at 18 inches from the imaged plate.

The ink receptivity in the imaged areas only was found to be excellent by soaking the sheet under tap water for 30 seconds and then rubbing a standard black rubber-based offset ink on the imaged surface side followed by a water wash.

EXAMPLE 2

A HEWLETT PACKARD (trade name of Hewlett Packard Corporation) black ink jet cartridge, catalog #51625A, was emptied by piercing the top plug and withdrawing the liquid ink with a pipette. The cartridge was then rinsed twice with a solution consisting of 3 parts of isopropyl alcohol and 2 parts of dimethylsulfoxide. An ink jet fluid consisting of 4 parts of a chromium complex of an organic acid, sold as a 25% to 30% solution in isopropyl alcohol under the trade name of QUILON C by Dupont Corporation, and 1 part of isopropyl alcohol was prepared and used to fill the cartridge with the aid of a pipette. The cartridge was then placed in the cartridge holder of a HEWLETT PACKARD ink jet printer, a thermal type desktop ink jet printer sold under the trade name of HP540C, and imaged, treated with heat, and tested as described in Example 1. The ink receptivity in the imaged areas only was found to be excellent and similar to the results in Example 1.

EXAMPLE 3

The cartridge containing QUILON C from Example 2 was placed in the cartridge holder of an ENCAD (trade name of Encad Corporation) ink jet printer, a thermal type 36 inch wide ink jet printer sold under the trade name of NOVAJET III.

Imaging, heat treatment, and testing as described in Example I gave results similar to the results in Example 1.

EXAMPLE 4

The procedure of Example 2 was followed except that a diketene emulsion, sold as a 10% solids emulsion by Hercules Corporation under the trade name of HERCON 79, was substituted for the ink jet fluid containing the QUILON C. The ink receptivity was found to be in the imaged areas only and similar to the results in Example 2.

EXAMPLE 5

The procedure of Example 1 was followed except that the imaging was done on a coated white opaque polyester film, sold by Epson Corporation under the trade name of EPSON GLOSSY PAPER. Analysis of the hydrophilic coating on the polyester film showed it to contain both aluminum boehmite inorganic polymer and a polyvinyl alcohol. The ink receptivity in the imaged areas only was found to be excellent and similar to the results in Example 1.

EXAMPLE 6

The imaged and heat treated plates from Examples 1 and 2 were printed on a conventional lithographic wet offset press using an oil-based black ink from Van Son Corporation and a fountain solution diluted by a ratio of 1:10 from a concentrate sold by Itek Corporation under the trade name of MEGAPLATE FOUNTAIN CONCENTRATE. Satisfactory image quality was achieved on the printed paper sheets throughout a continuous run of 3,000 impressions.

While the invention has been described in detail and with reference to specific embodiments thereof, it will be apparent to one skilled in the art that various changes and modifications can be made without departing from the spirit and scope thereof.

What is claimed is:

1. An ink jet fluid marking material composition comprising a liquid carrier medium and a reactive component, wherein said reactive component comprises one or more chromium complexes of organic acids.

2. The composition of claim 1, wherein said one or more chromium complexes comprise one or more Werner complexes of trivalent chromium and an organic carboxylic acid.

3. The composition of claim 2, wherein said organic carboxylic acid is selected from the group consisting of myristic acid and stearic acid.

4. A method for preparing printed images having improved durability and water-insolubility comprising the steps of:
   (a) providing a printing medium comprising a support that bears a receiving layer comprising at least one hydrophilic material;
   (b) providing an ink jet fluid marking material composition comprising a liquid carrier medium and a reactive component, wherein said reactive component comprises one or more chromium complexes of organic acids;
   (c) printing said composition on the receiving layer of the support of said printing medium in a desired imagewise pattern to form a printed medium; and
   (d) exposing said printed medium to an energy source that activates said reactive component, thereby forming a durable and water-insoluble layer in said desired imagewise pattern on said printed medium.

5. The method of claim 4, wherein said one or more chromium complexes comprise one or more Werner complexes of trivalent chromium and an organic carboxylic acid.

6. The method of claim 5, wherein said organic carboxylic acid is selected from the group consisting of myristic acid and stearic acid.

7. The method of claim 4, wherein said energy source in step (d) is heat.

8. The method of claim 4, wherein said energy source in step (d) is selected from the group consisting of:
   electron beam radiation, ultraviolet radiation, visible radiation, or infrared radiation.

9. The method of claim 4, wherein said energy source in step (d) is ultraviolet radiation.

10. A method for printing which comprises providing an ink jet fluid marking material composition comprising a liquid carrier medium and a reactive component, wherein said reactive component comprises one or more chromium complexes of organic acids, in an ink jet printer and applying said composition to a printing medium with the ink jet printer.

* * * * *